US012260770B2

(12) United States Patent
Uysal et al.

(10) Patent No.: US 12,260,770 B2
(45) Date of Patent: Mar. 25, 2025

(54) VARIABLE PROTECTION ZONE COLLISION AVOIDANCE SYSTEM AND METHOD FOR AIRCRAFT TO REDUCE UNNECESSARY ALERTS

(71) Applicant: ASELSAN ELEKTRONIK SANAYI VE TICARET ANONIM SIRKETI, Ankara (TR)

(72) Inventors: Ahmet Bora Uysal, Ankara (TR); Yusuf Pasa, Ankara (TR); Huseyin Unal, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 0 days.

(21) Appl. No.: 18/538,167

(22) Filed: Dec. 13, 2023

(65) Prior Publication Data

US 2024/0194084 A1 Jun. 13, 2024

(30) Foreign Application Priority Data

Dec. 13, 2022 (TR) ................................ 2022/019173

(51) Int. Cl.

| | |
|---|---|
| ***G08G 5/55*** | (2025.01) |
| ***G08G 5/21*** | (2025.01) |
| ***G08G 5/59*** | (2025.01) |
| ***G08G 5/74*** | (2025.01) |
| ***G08G 5/76*** | (2025.01) |
| ***G08G 5/80*** | (2025.01) |

(52) U.S. Cl.
CPC ................. *G08G 5/80* (2025.01); *G08G 5/21* (2025.01); *G08G 5/55* (2025.01); *G08G 5/59* (2025.01); *G08G 5/74* (2025.01); *G08G 5/76* (2025.01)

(58) Field of Classification Search
CPC .. G08G 5/80; G08G 5/74; G08G 5/55; G08G 5/21; G08G 5/76; G08G 5/59
See application file for complete search history.

(56) References Cited

U.S. PATENT DOCUMENTS 9,196,168 B2 11/2015 McCollough et al.

*Primary Examiner* — Mathew Franklin Gordon
(74) *Attorney, Agent, or Firm* — Bayramoglu Law Offices LLC

(57) ABSTRACT

A collision avoidance system and method is provided for detecting obstacles or terrain likely to be encountered by fixed wing or rotary wing platform aircraft in bad weather conditions or at low altitude, and for alerting the user in advance.

7 Claims, 2 Drawing Sheets

VARIABLE PROTECTION ZONE COLLISION AVOIDANCE SYSTEM AND METHOD FOR AIRCRAFT TO REDUCE UNNECESSARY ALERTS

CROSS REFERENCE TO THE RELATED APPLICATIONS

This application is based upon and claims priority to Turkish Patent Application No. 2022/019173, filed on Dec. 13, 2022, the entire contents of which are incorporated herein by reference.

TECHNICAL FIELD

The invention relates to a collision avoidance system and method for detecting obstacles or terrain likely to be encountered by fixed wing or rotary wing platform aircraft in bad weather conditions or at low altitude, and for alerting the user in advance, with a variable protection zone that reduces unnecessary alerts.

BACKGROUND

Nowadays, it is observed that there are obstacles and terrain (elevations such as mountains, hills and power lines etc.) that will affect the safe flight of aircraft flying at a certain height. There are alerting systems that will notify the pilot against possible collisions with these obstacles and terrain that threaten the safe flight of aircraft. These alerting systems are divided into two as passive systems and active systems. In active systems, the obstacles or terrain in front of the aircraft are detected by means of electromagnetic, radar or laser, but these systems are generally not preferred due to their heavy weight and the fact that the weight of the aircraft is a factor affecting the flight performance. Passive systems include geo-location-based prevention systems and physical prevention systems (cable cutter truss). Especially in geo-location-based interceptor systems, databases containing terrain height data and obstacles are used. These systems provide pre-collision alerts to the pilot by using the aircraft's position, altitude, track angle and speed data. Geo-location-based interceptor systems in the known state of the art alert according to the position of the aircraft using obstacle and terrain databases and GPS, but cannot generate an alert according to the orientation of the aircraft. This causes unnecessary alerts to be given to obstacles or terrain that do not pose a threat during turning maneuvers and the problem of not being able to give alerts to obstacles or terrain that are likely to collide due to orientation. This problem increases the workload of the pilots, reduces the confidence to the system and causes the pilot to inhibit the system in systems that generate audible alerts.

In the document U.S. Pat. No. 9,196,168, which is in the prior art, an obstacle and terrain alerting system for helicopters is mentioned. In the said patent document, it is explained that radar systems are used to detect obstacles and terrain at a certain distance. In the said invention, the system alerts the user in objects that are not likely to get in front of the aircraft according to the direction of movement of the aircraft, but enter the radar. This situation causes the aircraft to generate alerts to obstacles or terrain that are not likely to be encountered. In addition, it cannot give an alert according to the orientation of the aircraft, which causes unnecessary alerts or the problem of not alerting the obstacles or terrain that are likely to collide due to the orientation.

SUMMARY

The purpose of the invention is to provide a collision avoidance system and method that better detects obstacles or terrain that pose a threat to the aircraft and does not alert against obstacles or terrain that do not pose a risk of collision according to the direction of movement of the aircraft. Another purpose of the invention is to provide a collision avoidance system and method for detecting possible obstacles or terrain relative to the rotation of the aircraft.

A collision avoidance system according to the purpose of the invention as defined in the first claim and the dependent claims of the present invention, for detecting obstacles or terrain likely to be encountered by fixed wing or rotary wing platform aircraft in bad weather conditions or at low altitude, and for alerting the user in advance. The collision avoidance system includes a sensor module to detect the position, track angle, ground speed and altitude of the aircraft. There is a memory module with terrain and obstacle databases. This database consists of terrain elevation data (DTED—Digital Terrain Elevation Data) and object data including geographical locations of objects such as power lines, television antenna masts, wind turbines, water tanks, etc. Using the data from the sensor module, a control unit is adapted to determine the path/distance to be travelled by the aircraft as a corridor. The created corridor determines the points that the aircraft can reach according to its linear progress. In case there is an obstacle or terrain on the corridor of the aircraft, in other words, if one of the corridor points that the aircraft can reach after a predetermined time intersects with an obstacle or terrain, the control unit includes an adapted alerting system to alert the user.

A collision avoidance method as defined in the first claim of the present invention and the dependent claims, wherein the position, sea level altitude, track angle and ground speed values of the aircraft are received from the sensor module. With the values received by the control unit from the sensor module, the corridor that the aircraft will reach after a certain period of time is determined. The obstacles and terrain data within the corridor are read from the memory module. It is evaluated whether the determined corridor intersects with any obstacle/terrain or not. If an obstacle or terrain is encountered, the control unit sends an alert to the alerting system so that the user is aware of the obstacle or terrain. If the point that the aircraft will reach after a certain period of time does not intersect with any obstacle or terrain and an alert is currently active, a separate command is sent to the audible alerting system to remove the alert. The current data received from the sensor module is read from the sensor module in certain periods and the same calculations are made and continuous protection is provided.

BRIEF DESCRIPTION OF THE DRAWINGS

A collision avoidance system for achieving the object of the present invention is shown in the accompanying figures.

Figure 1:
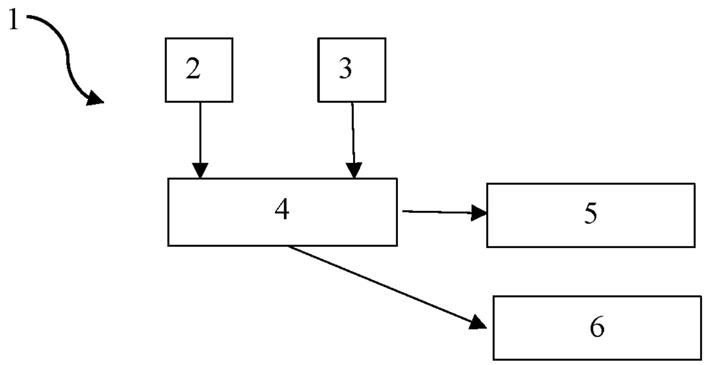
FIG. 1 is schematic view of the collision avoidance system.

The parts in the figures are individually numbered and the equivalents of these numbers are given below.

1. Collision avoidance system
2. Sensor module

3. Memory module
4. Control unit
5. Display device
6. Audible alerting system
H. Aircraft
K. Corridor
α. Angle
i. Track angle direction

DETAILED DESCRIPTION OF THE EMBODIMENTS

A collision avoidance system (1) according to the invention, for detecting obstacles and terrain likely to be encountered by fixed-wing or rotary-wing platform aircraft (H) in bad weather or at low altitude, and for alerting the user in advance;

- a sensor module (2) positioned on the aircraft (H) and adapted to measure data such as the position, sea level altitude, track angle and ground speed of the aircraft (H),
- a memory module (3) containing an obstacle and terrain database,
- a control unit (4) adapted to generate a corridor (K) from the points to be reached by the aircraft (H) on the obstacle and terrain databases in the memory module (3), using values received from the sensor module (2),
- a display device (5) adapted for the control unit (4) to display the aircraft (H) and the aircraft (H) corridor (K) to the user on the obstacle and terrain databases,
- an audible alerting system (6) adapted to alert the user of the control unit (4) in the event of an obstruction on the flight corridor (K) of the aircraft (H).

The inventive collision avoidance system (1) is designed to detect and warn the user in advance of obstacles and terrain likely to be encountered by fixed wing or rotary wing platform aircraft (H) in bad weather conditions or at low altitude. The collision avoidance system (1) includes a sensor module (2) that can detect the position, track angle, ground speed and sea level altitude of the aircraft (H). The system also includes a memory module (3) with obstacle and terrain databases. These databases contain terrain elevation data (DTED—Digital Terrain Elevation Data), geographical positions of objects such as power lines, television antenna masts, wind turbines, water tanks, etc. From the sensor module (2), the position of the aircraft (H), sea level altitude, ground speed and track angle are sent to the control unit (4). Using the received values, the control unit (4) determines the path/distance to be travelled by the aircraft (H), e.g. after a maximum of 20 s, as a corridor (K). The control unit (4) processes the generated corridor (K) with the obstacle and terrain database received from the memory module (3). The generated corridor (K) determines the points that the aircraft (H) can reach according to its linear progress. If there is an obstacle or terrain on the corridor (K) of the aircraft (H) according to the obstacle and terrain databases, in other words, if the corridor (K), which the aircraft (H) can reach after a predetermined time, encounters an obstacle or terrain according to the obstacle and terrain database, the control unit (4) generates visual and audible alerts to inform the user. Visual alerts are displayed to the user on the display device (5). Audible alerts are also transmitted to the user via the audible alerting system (6). The collision avoidance system (1) according to the invention better detects obstacles and terrain that pose a threat to the aircraft (H) and does not alert against obstacles and terrain that do not pose a risk of collision according to the track angle direction (i) of the aircraft (H). Furthermore, the inventive subject matter enables the aircraft (H) to detect possible obstacles and terrain according to the turn of the aircraft (H).

In more detail, the control unit (4) creates a corridor (K) with width, length, and depth in order to predict the path/distance to be travelled by the aircraft (H) after a predetermined period of time, e.g. after a maximum of 20 seconds. In order to determine the length of the corridor (K) in meters, the following formula is applied by the control unit (4).

$$\text{Corridor } (K) \text{ length (m)} = \text{Aircraft } (H) \text{ ground speed (m/s)} \times 20 \text{ s}$$

In the same way, the following formula was applied to determine the width of the corridor (K) of the control unit (4) in meters.

$$\text{Corridor } (K) \text{ width (m)} = \text{Aircraft } (H) \text{ ground speed (m/s)} \times 20 \text{ s}$$

The control unit (4) uses a fixed value as the depth of the corridor (K), determined according to the operating requirements of the aircraft (H).

Figure 2:
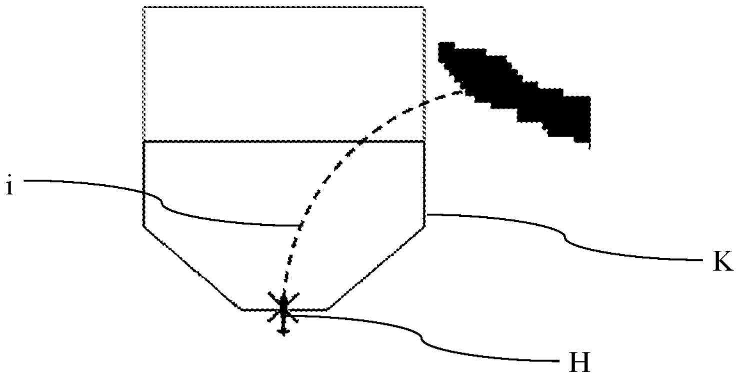
FIG. 2 is a view of protection zone with no turn support according to the aircraft orientation.

Based on the aircraft (H) data received from the sensor module (2), the control unit (4) creates a volumetric corridor (K) with width, length and depth values. The control unit (4) creates the corridor (K) with the aircraft (H) positioned at the head. This positioning is shown in FIG. 2. The aforementioned corridor (K) is determined depending on the position, speed relative to the ground, track angle and height above sea level of the aircraft (H) received from the sensor module (2). In other words, if the aircraft (H) is travelling linearly, the corridor (K) is determined linearly in the track angle direction (i) by the control unit (4).

Figure 3:
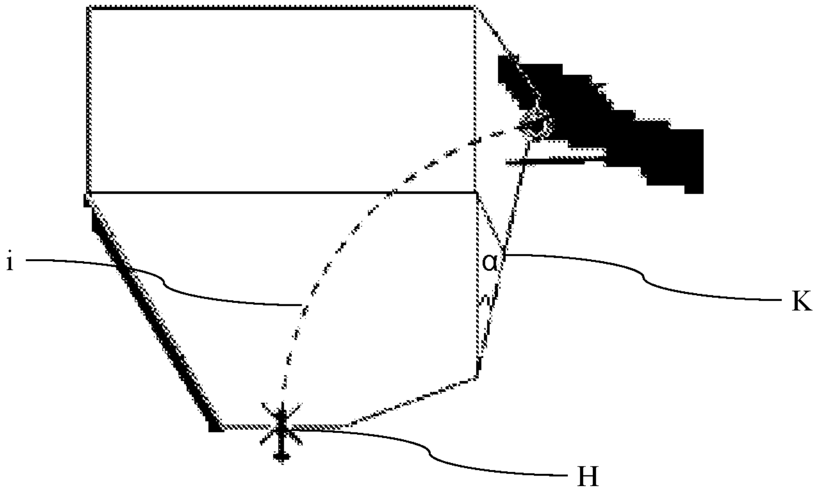
FIG. 3 is a view of protection zone with turn support according to aircraft orientation.

During the turn of the aircraft (H), in other words, when the track angle of the aircraft (H) changes, the linearly determined corridor (K) covers areas that are not likely to be encountered by the aircraft (H) and therefore unnecessary alerts may be generated. In order to prevent unnecessary alerts, during the turn of the aircraft (H), in other words, when the track angle of the aircraft (H) changes, the control unit (4), using the data received from the sensor module (2), expands the corridor (K) area by a certain angle (α) according to the track angle change of the aircraft (H) and the track angle direction (i). A triangle is formed according to the track angle direction (i) from the angle (α) value obtained by multiplying the rotation speed (degrees/second) of the aircraft (H) by a predetermined constant and the width and length values generated by the control unit (4). The angle (α) of this triangle is shown on FIG. 3. This angle (α) is determined to cover all possible obstacles and terrain that may pose a threat to the aircraft (H) at a predetermined rotation speed of the corridor (K), i.e. 3 degrees/second rotation. The control unit (4), which can expand the corridor (K) according to the rotation speed of the aircraft (H), first creates an additional triangular corridor (K) next to the linear corridor (K) according to the rotation speed of the aircraft (H), and in addition to this, it creates additional triangular corridors (K) in order to remove the areas that are not likely to encounter an obstacle or terrain according to the rotation speed of the aircraft (H) from the corridor (K). These triangular corridors (K) prevent the control unit (4) from generating unnecessary alerts to the audible alerting system (6) due to obstacles or terrain that are not likely to be encountered. Thanks to the subject matter of the invention, the obstacles or terrain that the aircraft (H) may encounter according to the track angle direction (i) are alerted, which enables the collision avoidance system (1) to provide more accurate and effective alerts compared to other systems.

In a preferred embodiment of the invention, a display device (5) is adapted to display alerts generated by the control unit (4). The display device (5) shows the instantaneous position of the aircraft (H) and the corridor (K) specified by the control unit (4). By means of the display device (5), the user can also see the position of the obstacles or terrain and thus determine which direction to steer the aircraft (H) in dark and foggy weather conditions.

In a preferred embodiment of the invention, the audible alerting system (6) comprises a sound system and provides an audible alert to the user when an alert is generated.

Figure 4:
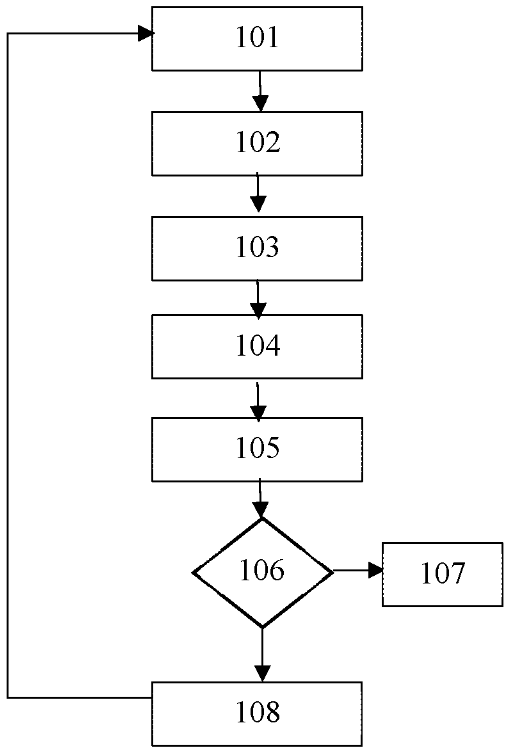
FIG. 4 is a view of the collision avoidance method steps.

The reference numerals in the flow diagram shown in FIG. 4 and in the explanations hereinafter in relation to the inventive collision avoidance method and the explanations of these reference numerals are as follows:

101. the sensor module (2) sends the position, sea level altitude, track angle and speed relative to the ground of the aircraft (H) to the control unit (4),

102. using the values received by the control unit (4), to determine the corridor (K) that the aircraft (H) will reach after a certain time,

103. determination of the difference of the instantaneous track angle of the aircraft (H) of the control unit (4) with the previous track angle and determination of the rotation speed using this difference,

104. The aircraft (H) expands the corridor (K) that it will reach after a certain period of time at a certain angle ($\alpha$) according to the track angle and rotation speed of the aircraft (H), the non-threatening areas are removed from the corridor (K) and the final corridor (K) is determined,

105. reading the obstacles and terrain data in the corridor (K) determined by the control unit (4) from the memory module (3),

106. assess whether the corridor (K) in which the control unit (4) is located intersects an obstacle or terrain,

107. if it intersects with an obstacle or terrain, the control unit (4) sends an alert to the audible alerting system (6),

108. the control unit (4) sends a different command to the audible alerting system (6) to remove the existing alert if the point where the aircraft (H) will arrive after a certain time does not intersect with an obstacle or terrain and there is an active alert,

109. After the control unit (4) has finished all operations, go to step 101 again to read the current data from the sensor module (2)

A collision avoidance method adapted for the operation of a collision avoidance system (1) according to the invention, characterized in that includes the following method steps;

sending to the control unit (4) the position, sea level altitude, track angle and speed relative to the ground of the aircraft (H) from the sensor module (2) (101), determining the corridor (K) that the aircraft (H) will reach after a certain period of time by using the values received by the control unit (4) (102), determining the difference of the instantaneous track angle of the aircraft (H) with the previous track angle by means of the control unit (4) and determining the rotation speed using this difference (103), extending the corridor (K) that the aircraft (H) will reach after a certain period of time at a certain angle ($\alpha$) according to the track angle and rotation speed of the aircraft (H), removing from the corridor (K) of the non-threatening areas and determining the final corridor (K) (104), reading the obstacles and terrain data in the corridor (K) determined by the control unit (4) (105) from the memory module (3), evaluating whether the corridor (K) which the control unit (4) is determined intersects an obstacle or terrain (106), sending an alert to the audible alerting system (6) of the control unit (4) if it intersects an obstacle or terrain (107), sending a different command to the audible alerting system (6) of the control unit (4) to remove the existing alerts, if the point where the aircraft (H) will arrive after a certain time does not intersect with an obstacle or terrain and there is an active alert (108), after finishing all operations of the control unit (4), moving on the step 101 again to read the current data from the sensor module (2) (109).

In a collision avoidance method adapted for operation in a collision avoidance system (1) of the invention, the position, sea level altitude, track angle and speed relative to the ground of the aircraft (H) are received from the sensor module (2) (101). Using the values received by the control unit (4), the corridor (K) that the aircraft (H) will reach after a certain time is determined (102). The difference between the track angle and the previous track angle and then the rotation speed of the aircraft (H) are determined by using this difference (103). Then, the control unit (4) expands the corridor (K) that the aircraft (H) will reach after a certain period of time by a certain angle ($\alpha$) according to the track angle, rotation speed and track angle direction (i) of the aircraft (H), and removes the non-threatening regions from the corridor (K) and the final corridor (K) is determined (104). The obstacles and terrain within the corridor (K) determined by the control unit (4) are read from the memory module (3) (105). The control unit (4) evaluates whether the determined corridor (K) intersects any obstacle or terrain read from the memory module (3) (106). If the corridor (K) intersects an obstacle or terrain, the control unit (4) sends an alert to the audible alerting system (6) (107). If there is no intersection and an alert is currently active, it sends a command to the audible alerting system (6) to remove the existing alerts and the alert is removed from the audible alerting system (6) (108). After the control unit (4) has completed all the operations, it proceeds to step 101 to read the current data from the sensor module (2) and perform the same operations again, thus providing continuous protection. The inventive collision avoidance method provides a better detection of obstacles or terrain that pose a threat to the aircraft (H) and does not alert against obstacles or terrain that do not pose a risk of collision with respect to the track angle direction (i) of the aircraft (H). Furthermore, the invention enables the aircraft (H) to detect possible obstacles or terrain according to its rotation.

What is claimed is:

1. A collision avoidance system, comprising:

a sensor module wherein the sensor module is positioned on an aircraft to detect obstacles and terrain likely to be encountered by a fixed wing or rotary wing platform aircraft in bad weather conditions or at a low altitude and to alert a user in advance, and the sensor module is adapted to receive position, sea level altitude, track angle and speed values of the aircraft relative to the ground, a memory module, wherein a obstacle or terrain database is placed in the memory module, a control unit, wherein the control unit is adapted to generate a corridor from points where the aircraft will reach on the obstacle or terrain database in the memory module using the values received from the sensor module, wherein the control unit is adapted to expand an area of the corridor at a certain angle with respect to a track angle direction and a track angle of the aircraft and to exclude from the corridor places that cannot be reached with respect to the ground speed and track angle direction of the aircraft, and an audible alerting system, wherein the audible alerting system is adapted to alert the user of the control unit in an event of an obstacle or terrain on the flight corridor of the aircraft.

2. The collision avoidance system according to claim 1, further comprising a display device, wherein the display device is adapted for displaying data of the corridor generated by the control unit and the obstacle or terrain posing a threat to the user.

3. The collision avoidance system according to claim 1, wherein the audible alerting system comprises a sound system.

4. A collision avoidance method for the collision avoidance system according to claim 1, comprising following process steps:

sending the position, sea level altitude, track angle and speed of the aircraft relative to the ground from the sensor module to the control unit, determining the corridor that the aircraft will reach after a certain period of time, determining a difference of an instantaneous track angle of the aircraft with a previous track angle by the control unit and determining a rotational speed of the aircraft using the difference, extending the corridor that the aircraft will reach after a certain period of time at a certain angle according to the track angle and rotation speed of the aircraft by the control unit, removing from the corridor of non-threatening areas and determining the final corridor, reading the obstacles and terrain data in the corridor determined by the control unit from the memory module, evaluating whether the corridor which the control unit is determined intersects an obstacle or terrain, sending an alert to the audible alerting system of the control unit when the corridor intersects the obstacle or terrain, sending a different command to the audible alerting system of the control unit to remove the existing alerts, when the point where the aircraft will arrive after a certain time does not intersect with an obstacle or terrain and there is an active alert, and after finishing all the operations of the control unit, moving on step 101 again to read the current data from the sensor module.

5. The collision avoidance system according to claim 2, wherein the audible alerting system comprises a sound system.

6. The collision avoidance method according to claim 4, wherein the collision avoidance system further comprises a display device, wherein the display device is adapted for displaying data of the corridor generated by the control unit and the obstacle or terrain posing a threat to the user.

7. The collision avoidance method according to claim 4, wherein in the collision avoidance system, the audible alerting system comprises a sound system.

* * * * *